United States Patent [19]
Sobotta

[11] 3,847,472
[45] Nov. 12, 1974

[54] DUAL PHOTOGRAPHIC SLIDE PROJECTOR

[75] Inventor: Reinhard Sobotta, Mascherode, Germany

[73] Assignee: Rollei-Werke Franke & Heidecke, Braunschweig, Germany

[22] Filed: Nov. 30, 1973

[21] Appl. No.: 420,717

[30] Foreign Application Priority Data
Dec. 6, 1972  Germany .................... 2259651

[52] U.S. Cl. ................. 353/94, 353/87, 353/116
[51] Int. Cl. ........................................... G03b 21/26
[58] Field of Search ............ 353/82, 83, 85, 86, 87, 353/94, 90, 89, 92, 93, 113, 116

[56] References Cited
UNITED STATES PATENTS

| | | | |
|---|---|---|---|
| 3,468,603 | 9/1969 | Kovarik et al. | 353/86 |
| 3,501,231 | 3/1970 | Fisher | 353/82 |
| 3,563,646 | 2/1971 | Harvey | 353/83 |

*Primary Examiner*—Harry N. Haroian
*Attorney, Agent, or Firm*—Stonebreaker & Shepard

[57] ABSTRACT

A dual or twin projector for photographic slides. Mounted in a single casing or housing are two projection lenses side by side with their optical axes parallel to each other. There are two slide holders, one for each optical axis, for holding the respective slides in projection position in the respective optical axes. Each slide holder is movable in the direction of the optical axis from a rear loading and unloading position to a forward projection position.

16 Claims, 4 Drawing Figures

DUAL PHOTOGRAPHIC SLIDE PROJECTOR

BACKGROUND OF THE INVENTION

The invention relates to a twin or dual photographic slide projector, having two separate projection lenses arranged side by side with their optical axes parallel to each other, each separate optical axis having a slide holder or carrier for holding a picture slide in proper projection position. Slide transfer mechanism or pusher mechanism takes slides successively from a single magazine or slide tray, loading one slide into the slide holder in the first optical axis, the second slide into the slide holder of the second optical axis, the third slide into the holder of the first axis, the fourth slide into the holder of the second axis, and so on.

In a known slide projector of the aforementioned kind a fading operation is carried out in which the projected images of successive slides smoothly give place to one another without any visually disturbing transition. While one slide is being projected by one lens the preceding slide is removed from its alignment is relation to the other lens and replace by the next slide. In an image changing operation the illumination of the projected slide is gradually reduced while that of the slide aligned in respect of the other lens is increased to projection intensity, so that the projected image of the first slide gradually fades and that of the subsequent slide at the same time becomes visible.

Most known slide projectors of the kind mentioned at the beginning suffer from the necessity of alternating the projection position of the successive slides, from the unpractical arrangement of the slides in two different magazines, and from the resulting alternating arrangement of these slides in accordance with the desired projection sequence. A device has therefore been proposed for the alternating extraction of successive slides from one single magazine, the slides then being moved into two alternating projection positions. This device, however, calls for a fairly complicated and unpractical construction, which suffers from the addition drawback that the slides cannot be deposited back in the magazine in the correct order, so that the slides in the magazine have to be rearranged after each projection sequence.

Fading projectors have also become known which operate with a magazine between the two projection axes, which requires the slides to be removable from the slide magazine in two directions, so that standard magazines can not be used.

The object on which the present invention is based is therefore to design a slide projector with a device for fading two successive slides in the course of the picture change operation, so designed that use can be made of a standard conventional magazine from which the slides can only be removed towards one side, and into which they can be fed from one side, while its fading device can be constructed on simple and particularly practical lines.

SUMMARY OF THE INVENTION

Based on a slide projector of the type mentioned at the beginning, the invention enables the above mentioned object to be achieved as a result of the fact that the transverse working plane of the alternating pusher or slide changer is situated farther back than the focusing plane by at least the over-all axial length of the illumination systems, while both slide holders or carriers are alternately movable in the axial direction, so that in each slide change operation one slide carrier is situated in the focusing plane and the other in the alternating slide changer plane. This arrangement offers the advantage that the slide, after the fading, can be returned, in a horizontal direction, behind the projector unit, into the magazine, so that the known projector magazines, without fading devices, removable to the side and in one direction, i.e., the magazines most frequently used in practice, can continue to be used, without any sorting operations being needed after the slides in the magazine have been projected.

The invention enables the slide carriers to be rigidly connected to their illumination systems to form a projection unit. The simultaneous displacement of slide carrier and illumination system enables the condenser to be arranged in the most advantageous manner in respect of the slide picture to be illuminated. When the slide carrier is not permanently combined with the illumination system, the condenser in practice has to be over-dimensioned, which means that in order to insure that the slide picture to be illuminated will not move out of the ray path in the focusing operation the diameter of the condenser has to be made greater from the outset than would be necessary for the focused slide picture.

In addition, this structure enables the stopping down or fading to be obtained by simply moving the projection unit back from the focusing plane into the plane of the alternating pusher or slide changer. The use of two illumination systems also enables the slide projector to be used both as a panorama projector and as a stereo projector. In panorama projection both pictures are simultaneously projected side by side onto the screen.

A further development of the invention provides an illumination system for both slide carriers, which is movable transversally to the optical axis. This arrangement enables one illumination system to be saved and renders the slide projector as a whole more compact.

In dimensioning this single illumination system for the slide projector, care should be taken to insure that the condenser of the illumination system, in the fading, will illuminate at least a half of each of the two slides. This insures more or less constant brightness of illumination on the projection screen in the fading process.

In a further development of the invention, a slide guide is provided behind the first projection unit, situated between the magazine and the second projection unit, in order to transfer a slide from the magazine to the slide carrier in front of the said second unit. This slide guide, in accordance with the shape of the slide carriers, is so designed that one of its sides extends almost to the magazine and its second side almost to the second slide carrier. This greatly facilitates and simplifies the transport of the slides by the aid of the alternating inserters and ejectors.

It is usual to provide an axially displaceable stop for fixing the axial position of the two slide holders or carriers, in the zone of the focusing plane. By means of this stop adjustable in the axial direction the slide to be projected is focused by means of an automatic focusing device.

In a further possible version of the invention the stop is preferably situated between the slide carriers and the projection lenses. This insures fully efficient utilization of the space available between the slide carriers and the lenses, and no additional stop lugs have to be provided on the slide carriers or the projection units.

In one advantageous version of the invention, driving and control devices are provided for the axial displacement of the slide carriers or projection units both into the zone of the focusing plane and into the focusing position. In this case the automatic focusing device acts on the axially displacement stop in such a way that the minor displacements required for the final focusing can be effected by means of the automatic focusing motor. As the projection unit is in any case made displaceable axially in respect of the optical axis, for the purpose of changing the slides, the focusing does not necessitate any axially displaceable mounting of the lens, over and above the existing screw threading.

To enable the slide projector to be driven in a simple manner, the projector is mechanically controllable, in accordance with a program, by the aid of gearing connections. This enables all control and driving functions called for in a given program to be performed with one driving motor.

According to a further characteristic of the invention, the projector is controllable by the aid of electrical driving elements. This version is particularly advantageous when the slide projector, in addition to the fading function, is required to perform further functions, such as those of a panorama or stereo projector.

In mechanical control of the slide projector the driving device comprises three disks mounted on a driving motor shaft, two control cams driving an alternating ejector and an alternating inserter via bellcrank levers, while the third, which is an eccentric disk, drives the projection units or the slide carriers by the aid of two bellcrank levers which rotate in opposite directions and each of which is coupled to a projection unit or slide carrier via sliding guides. The provision of the three superimposed disks on one driving shaft of a driving motor running in the forward and reverse directions fulfills all the mechanical driving functions required for the fading process.

To control the stepping of the magazine in the forward and in the reverse direction alternately, a control device is provided comprising an additional disk which is situated on the driving motor shaft and which by the aid of two parallel secants displaces in the driving direction a lever arm of a switching claw rotatably mounted on a slider and displaceable between two springs, the slider being mounted in a pin-and-slot guide and held and guided in a neutral position by means of two springs acting in opposite directions to each other in the direction of the slot and being fitted at the bearing point for the switching claw with a stop lug for the alternating inserter, while at the opposite end and at right angles to the direction of the slot it is provided with a guide track for one end of a rocker lever mounted between the optical axes and movable into two different angular positions by means of lugs provided on the illumination units. The displacement of the switching claw according to whether the single driving motor is running forward or in reverse at the same time determines the direction, forward or in reverse, as the case may be, of the magazine stepping movement. Owing to this apparatus the direction of the latter movement does not have to be controlled by an additional relay.

To insure that the compartment of the magazine which is situated in the plane of the alternating pusher will always be the one corresponding to the next program step, the length and the angle of movement of one rocker lever are selected to insure that in the forward program the said lever, in conjunction with the lugs, will perform a correction step in the reverse direction when one of the two slide carriers moves out of the focusing plane into the plane of the alternating pusher. On the reversal of the driving direction, e.g., on the transition from the forward to the reverse program of the slide projector, the said rocker lever will omit the correction step on the magazine.

Further advantages, details and characteristics of the invention will emerge from the following description of two examples shown schematically in the drawings.

DESCRIPTION OF THE PREFERRED EMBODIMENTS

Figure 1:
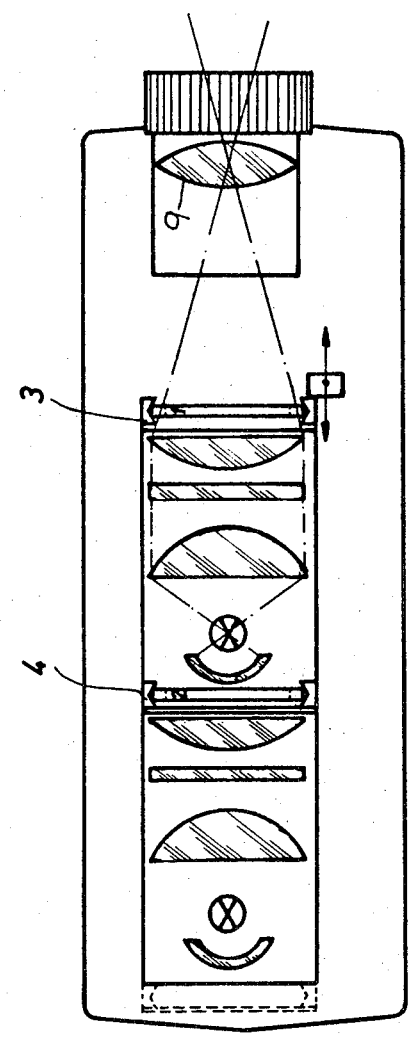
FIG. 1 is a schematic longitudinal vertical section taken axially along one of the two optical axes of a projector according to a preferred embodiment of the invention.
Figure 2:
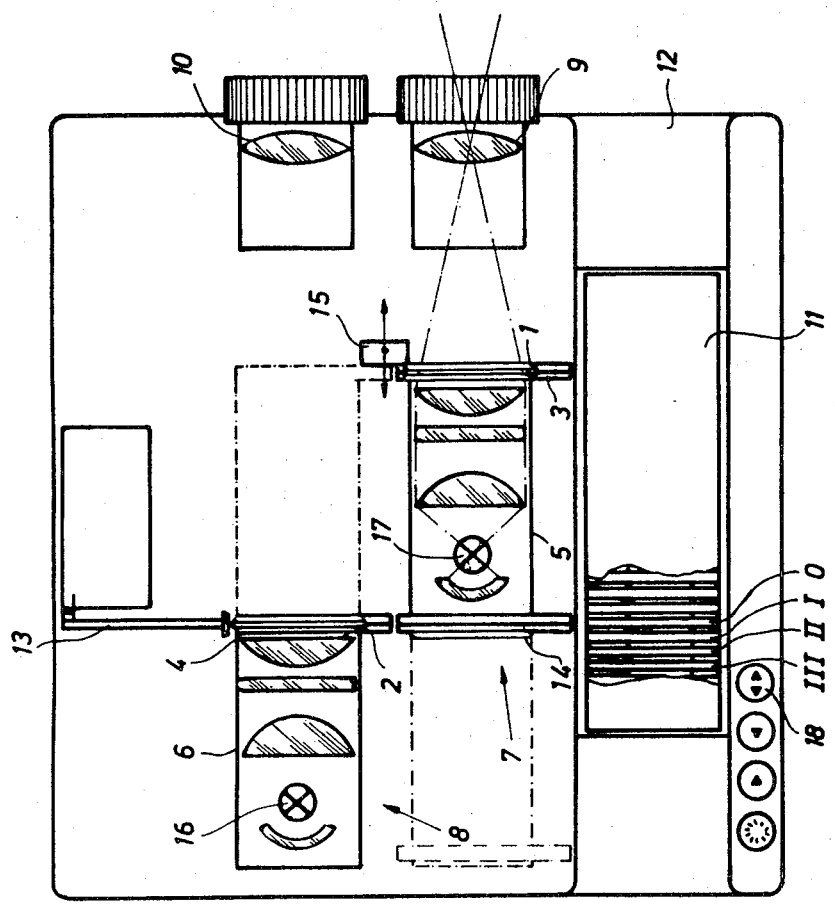
FIG. 2 is a schematic plan view of the same projector, with parts in horizontal section.

FIGS. 1 and 2 show a slide 1 in a first slide carrier 3 and a slide 2 in a second side carrier 4. The slide carriers or holders 3 and 4 are rigidly connected to the illumination systems 5 and 6, respectively which consist of the usual known elements, such as parabolic mirror 6a, lamps 16, 17, condenser 6b, heat absorption filter 6c, and condenser 6d. The illumination systems 5 and 6 are arranged so as to be displaceable, with the respective slide carrier 3 and 4, in the axial direction in respect of the optical axis. Each slide holder and its associated illumination system may be called a projection unit, designated in general by the numerals 7 and 8, respectively. Each moves forwardly and rearwardly on gudie rails, not shown. For the projection units 7 and 8, projection lenses 9 and 10 are provided respectively, in the direction of projection. A magazine 11 is likewise provided parallel to the projection unit 7 and 8 and in the same horizontal plane. In addition to the magazine and its guide track 12 are the operating switches for the forward and reverse movement, the release 18 and the lamp switch.

Mounted at the rear end of the projection unit 7, and on a level with the alternating ejector 13, is an additional slide guide 14. This slide guide 14 serves to made the slide 2 more easily transportable into the proper compartment, e.g., the compartment "O," of the magazines. The projection units 7 and 8 are locked in the projection position by means of an axially displaceable stop 15. This stop 15 is displaceable in the axial direction by any suitable known form of automatic focusing device, via mechanical or electrical connection devices, the details of which are not important for purposes of the present invention, and may be widely varied. As well understood in the art, an automatic focusing device will re-establish the proper distance between the projection lens and the central portion of the picture slide if and when this distance becomes incorrect (out of focus) because of buckling of the picture slide as a result of heat from the projection lamp.

The operation of the slide projector shown in FIGS. 1 and 2 will be described in detail below.

In the position shown, the image of the slide 1 in the projection unit 7 is depicted by means of the illumination system 5 and via the projection lens 9 on a projection screen not showing in the drawing, the rays taking the path shown by the dot-dash lines. The slide carrier 3 rests against the stop 15, which is responsible for the focusing of the slide. The stop 15 operates in conjunction with one of the usual automatic focusing devices in such a way that the slide comes to rest in the focusing plane.

The projection unit 8, on the other hand, occupies the position illustrated in FIG. 2, which is axially farther back than the unit 7, so that the slide 2 can be transported from the slide carrier 4, by the aid of the alternating ejector 13 of the slide changer mechanism and via the slide guide 14, past the rear of the illumination system 5, into the magazine 11, i.e., into the compartment "O." After the slide 2 has been deposited in the compartment "O," the magazine 11 is moved two steps forward, by mechanical gearing elements to be described in detail in due course, so that the compartment "II" comes to rest in the transverse plane of the alternating pusher member of the slide changer mechanism. An alternating pusher or inserter 19, shown in FIG. 3 but not shown in FIG. 2, in order to render the latter clearer, tkaes up the slide from the compartment "II" and transports it via the slide guide 14, past the projection unit 7, into the slide carrier 4, at the front of the projection unit 8.

On the next step of the cycle, the projection unit 8 moves forward together with the "new" slide from the compartment "II" into the projection position shown in broken lines. In this process the projection unit 8 moves against the stop 15 and is then conveyed, by the aid of the automatic focusing device interacting with the stop 15, into the focusing plane.

The "fading" of the new slide in the carrier 4 onto the slide 1 in the carrier 3 now takes place in such a manner that the lamp 16 of the projection unit 8 lights up to the same extent as the lamp 17 of the projection unit 7 darkens. The observer thus sees a picture projected onto the screen with an invariably constant degree of brightness, one picture disappearing (that of slide 1) and the other appearing in continually sharper contours. At the end of the fading process the lamp 16 is fully on and the lamp 17 is completely off.

The projection unit 7 can now be thrust backwards in the axial direction, together wth the slide 1, in which process the magazine is at the same time moved backwards by one step, so that the compartment "I" comes to rest in the plane of the alternating pusher. The carrier 3, together with its slide 1, is now situated directly in transverse alignment with the compartment "I" of the magazine 11. The alternating pusher 13 operating in a transverse plane to the rear of the projection unit 8 (which is now in its forward or projection position) now conveys the slide 1 into the compartment "I." When this has been done the magazine 11 is moved forward by a further two steps, by mechanical gearing elements to be explained is due course, so that the compartment "III" comes to rest in the transverse plane of the alternating pusher. The alternating inserter 19, not showk in FIG. 2 but shown in FIG. 3, conveys the "new" slide from the compartment "III" into the slide carrier 3 of the projection unit 7. The projection unit 7 then moves forward axially, along the optical axis, as far as the stop 15, after which, as described above, it is moved iwth its new slide into the exact focusing plane by means of the automatic focusing device, not shown in the drawing, acting to position the stop 15.

After a further fading process, in which the picture of the slide in the carrier 3 instead of that of the slide in the carrier 4 appears on the screen, the projection unit 8 moves back in the axial direction from its forward or projection position into its rearward or loading position shown in FIG. 2. The slide changing process takes place cyclically, in the manner described in the foregoing.

In place of the alternating increase and reduction in the illumination of the lamps 16 and 17 in the fading process, the slide projector can also be so designed that both lamps are continuously on. In this case the fading takes place when the projection units are diplaced in the axial direction into the projection position. In order to insure, here again, that the observer will always see a picture of constant brightness on the projection screen, one projection unit must move out of its own facusing position before the other projection unit occupies its own focusing position. With this type of fading the axial displaceability of the projection units 7 and 8 is utilized for the fading process.

When the slide projector is operated backwards, i.e., when the slides which have just been shown, in the manner described above, are required to appear once again on the screen, in the reverse order, the same processes takes place as in the forward direction, but in reverse. To interrupt the exhibition of slides, i.e., to convey all the slides back intothe magazine from the projection units, the release switch 18 is actuated. The release switch 18, when actuated, blocks the alternating inserter 19 shown in FIG. 3. The sequence of operations for the release is then the same as in the forward projection. The alternating inserter 19 is merely prevented from again conveying slides out of the magazine 11. The slides from the projection units 7 and 8 are thus conveyed in succession and in the correct order into the still vacant compartments in the magazine 11.

Figure 3:
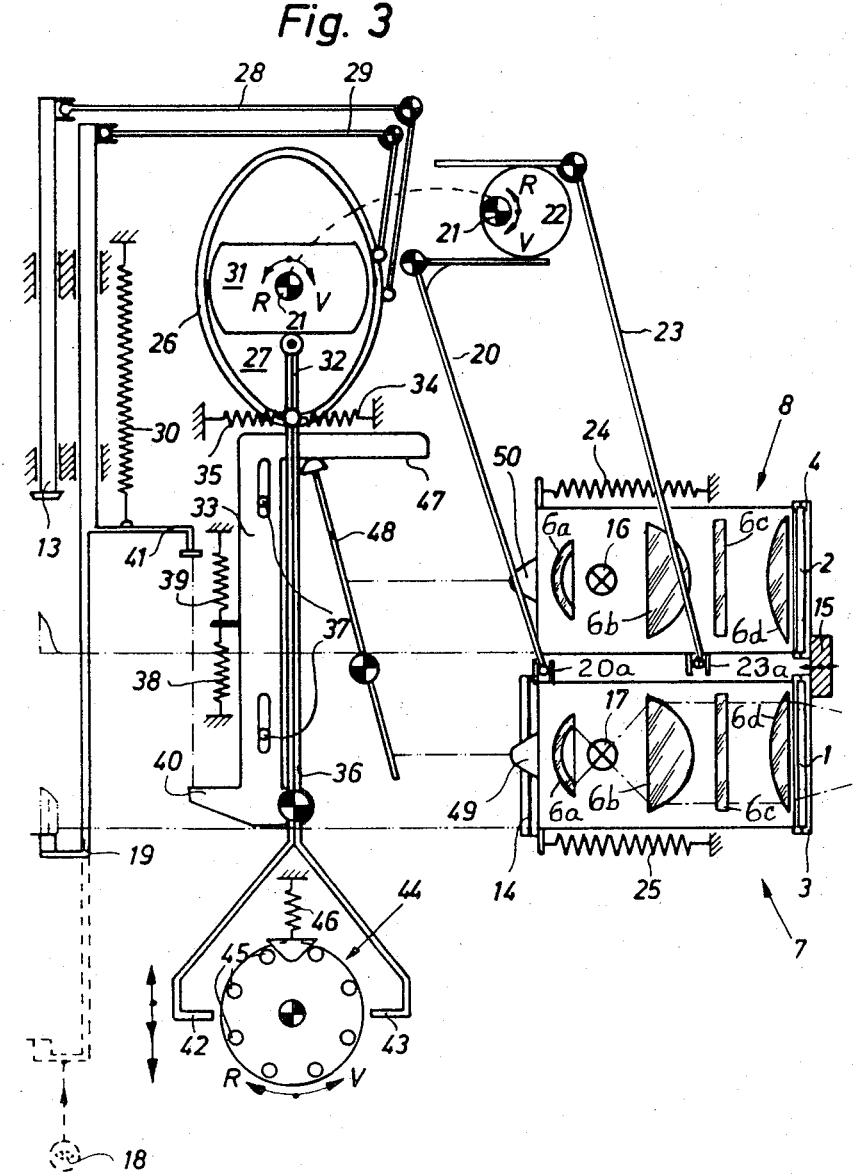
FIG. 3 is a schematic plan, with parts in horizontal section, of the driving and control mechanism for performing the various movements of the projector parts.

FIG. 3 provides a schematic diagram of a preferred version of a gearing for this slide projector described in connection with FIG. 2. The items marked 7 and 8 are again the projection units displaceable parallel with each other and axially in the direction of the optical axis. The projection unit 7 is displaced axially, in the direction of the optical axis, by a cam disk 22 eccentrically mounted on the driving motor shaft 21, via a transverse slide guide 20a and via a bellcrank lever 20 having an end displaceable in the guide 20a. That point on the cam disk 22 which is opposite to that on which the lever 20 acts is subjected to the action of another bellcrank lever 23, by which the projection unit 8 can be displaced in the direction of the optical axis, likewise via a transverse slide guide 23a. The projection units 7 and 8 are prestressed by the springs 24 and 25, in order to insure that the levers 20 and 23 will rest firmly in the slide guides.

The driving motor shafts 21 also has fixed to it the control cams 26 and 27. For the sake of clarity the eccentric disk 22 has been shown, together with the levers 20 and 23, to one side of the control cam disks 26 and 27, but actually these cam disks are all on the same shaft 21. A broken line indicates the relationship between the separately illustrated parts of the driving motor shaft 21.

The control cam disk 26 drives the alternating ejector 13 via a bellcrank lever 28, while the control cam disk 27 drives the alternating inserter 19, via another bellcrank lever 29. The alternating inserter 19 operates in opposition to the force of the spring 30 which is under tension when the said alternating inserter 19 is in the extended position.

The driving shaft 21 also bears a control cam 31, provided with two parallel straight sides or secants. One secant of this control cam is parallel to the optical axes of the projection units, when the system is in the neutral position, and then displaces, to the left or to the right, according to the driving direction of the driving motor shaft 21, a lever arm 32 of a switching claw 36 rotatably mounted on a slider 33 and displaceable between two springs 34 and 35. The slider 33 rests in a pin-and-slot guide 37 and is held and guided in a neutral position by means of two springs 38 and 39 operating in opposition to each other, in the direction of the slots. The slider 33 also interacts, via a stop lug 40, with a stop portion 41 of the alternating inserter 19. In the vicinity of the lug 40 the switching claw 36 is pivoted or fulcrumed on the slider 33. The switching claw 36, when pivoted, moves by its grippers 42 and 43 into the pins 45 arranged in a circle on the driving disk 44 of the magazine. The disk 44 is connected to the usual pinion which meshes with the conventional toothed rack on the slide magazine, so that rotation of the disk will move the magazine longitudinally. A positioning device 46 in the nature of a spring pressed detent thrust into the spaces between adjacent pins 45 prevents incorrect operations of the magazine driven by the magazine driving disk. The springs 34 and 35 of the switching claw 36 hold the switching claw in a central position with respect to the magazine driving disk 44 and control cam 31. That end of the slider 33 which is situated opposite to the stop lug 40 is provided with a guide track 47, at right angles to the direction of the guide slots of the slider 33. One end of a rocker lever 48, pivotally mounted between the optical axes of the projection units 7 and 8, rests against the guide track 47. Th3 other end of the rocker lever 48 interacts with a lug 49 of the projection unit 7. The lug 50 of the projection unit 8 also makes impact with the lever 48 at a point between its pivot bearing and the end of the lever 48 which rests against the guide track 47.

The method of operation of this mechanical gearing shown schematically in FIG. 3 for the slide projector shown in FIGS. 1 and 2 is as follows:

For diagrammatic reasons the projection unit 8 in FIG. 3 is shown in the position indicated by dot-and-dash lines in FIG. 2. The gearing in FIG. 3 occupies the position shortly before the fading of the slide 1 in the projection unit 7 onto the slide 2 in the projection unit 8 (path of rays shown by dot-and-dash lines).

After completion of the fading of the slide 1 onto the slide 2 (i.e., complete extinguishment of the image of slide 1 and complete visibility of the image of slide 2 in unit 8) the driving motor shaft 21 is rotated together with the eccentric disk 22 in the forward direction (V). In this process the eccentric disk 22 displaces the lever 20 in such a way that the projection unit 7 is moved via sliding guides in a rearward direction, in opposition to the force of the spring 25, until the slide carrier or holder 3 is in lateral alignment with the slide changing members 13 and 19.

Together with the cam disk 22, however, the control cam disks 26 and 27 and the control disk 31 likewise rotate. In a rotation of the control disk 31 in the forward clockwise direction (V) the lever arm end 32 of the switching claw 36 is displaced toward the left, in opposition to the force of the springs 34 and 35 of the switching claw, and the said switching claw 36 is rotated in such a way that its gripper 42 enters the group of pins 45 provided on the magazine driving disk 44. On the route taken by the projection unit 7 from the focusing or projection plane into the loading plane of the alternating pusher, the cam 49 moves one end of the rocker lever 48 in a clockwise direction. Owing to the rotation of the rocker lever 48, that end of the rocker lever which faces away from the operating lug slides over the guide track 47 of the slider 33. The slider 33 is thus displaced, in opposition to the force of the slider springs 38 and 39, in the direction of the control cam disks 26 and 27, as a result of which the obliquely positioned switching claw 36 at the same time, by the aid of its gripper 42, rotates the magazine driving disk 44, via the pins 45, by one step in the reverse direction (R). The displacement of the magazine by one step in the reverse direction insures that the slide 1 will be deposited in the same compartment from which it was previously extracted.

At the beginning of the movement of the projection unit 7 the alternating ejector 13 already moved, by the aid of the control cam disk 26 and the bellcrank lever 28, approximately as far as the level of the projection unit 8 (shown in dot-dask lines). The alternating inserter 19 moves, by the aid of the control cam disk 27 and the bellcrank lever 29, and in opposition to the force of a spring 30, out of the displacement range of the projection unit 7.

When the slide carrier or holder 3 with slide 1 has reached the plane of the alternating pusher, the alternating ejector 13 conveys the slide 1, transversally to the optical axis, into the magazine, not shown in FIG. 3 but shown in FIG. 2. The alternating inserter 19 moves, with its attachment 41, in the same direction as the alternating ejector 13. After the slide 1 has been deposited in the mazgazine the attachment 41, during the final part of its outward movement, makes impact against the stop lug 40 on the slider 33. The slider 33 thus moves the magazine shown in FIG. 2 in the forward direction by two steps, via the switching claw 36, the gripper 42, the pins 45, and the magazine driving disk 44. Two steps are required because the next compartment, not shown in FIG. 3, has already been evacuated for the projection unit 8.

The alternating inserter 19 now takes up the "new" slide and conveys it into the slide carrier 3 of the projection unit 7. In this rpocess the slider 33 and the switching claw 36, by the aid of the springs 38 and 39 and the slider and the springs 34 and 35 of the switching claw, return to their neutral positions, because the other secant or straight side of the control disk 31 becomes operative. In the second quarter-rotation of the eccentric disk 22, the projection unit 7, by the aid of the lever 20, moves back into the zone of the focusing plane. Here it is positioned, by the axially displaceable stop 15, in the outermost position, as viewed in the projection direction, of the focusing range. The fine adjustment of the projection unit 7 with the "new" slide contained in the carrier 3 now takes place in the direction of the plane of the alternating pusher, in opposition to the force of the spring 25, by means of an automatic focusing device which is not shown in the drawing and by which the stop 15 is displaced until the slide comes to rest exactly in the focusing plane.

By the darkening of the lamp 16 and the brightening of the lamp 17 a fading takes place, so that on a further rotation of the driving shaft 21 the projection unit 8 is displaced, by the aid of the eccentric disk 22 and the lever 23, and in opposition to the force of the spring 24, in the direction of the plane of the alternating pusher. In this process the lug 50 displaces the rocker lever 48 in a counterclockwise direction and the magazine is moved by one step in the reverse direction (R), via the known elements described above, guide track 47, slider 33, switching claw 36, gripper 42, pins 45, and magazine driving disk 44. The empty magazine compartment belonging to the slide 22 is thus situated in the plane of the alternating pusher.

In the next step the alternating ejector 13 pushes the slide 2 out of the slide carrier 4 and, via the slide guide 14 situated behind the projection unit 7, into the empty compartment in the magazine, the latter not being shown in this drawing (FIG. 3).

After the slide 2 has been deposited in the magazine the alternating inserter 19 is once again moved outwards, so that its attachment 41, via the stop lug 40, the slider 33, the switching claw 36, the gripper 42, the pins 45, and the magazine driving disk 44, displaces the magazine by two steps in the forward direction (V) (as shown by the double arrow to the left of the member 42). On the further rotation of the control cam disk 27 the alternating inserter 19, by the aid of the lever 29 and the spring 30, once again conveys the second "new" side, via the slide guide 14 behind the projection unit 7, into the slide carrier 4 of the projection unit 8. The said projection unit 8 inow displaced axially along the optical axis, as far as the displaceable stop 15, by the aid of the spring 24 an in accordance with the guiding of the lever 23 and the eccentric disk 22. The focusing, as in the previous process, described in connection with the projection unit 7, is carried out in the direction of the plane of the alternating pusher, by the displacement of the stop 15. After the "new" second slide is situated the focusing plane, a fading can once again be effected onto this slide and a further projection cycle can commence.

The release switch 18 is pressed in order to terminate the slide projection program and cause the slides present in the slide carriers to be returned to the magazine. This release switch 18, via mechanical or electrical connecting devices, causes the alternating inserter 19 to be blocked in the direction of the displacement range of the projection units 7 and 8. This insures that when the motor driving shaft 21 is actuated, all the drive operations described in the foregoing will take place in the same manner in the release process. No further new slides, however, will be conveyed out of the magazine, because the alternating inserter 19 is blocked in the insertion direction. It is blocked in such a way that its attachment 41 is situated in the immediate vicinity of the stop lug 40 of the slider 30. After a complete rotation of the driving shaft 21 all the slides have been removed from the projection units 7 and 8 and can be extracted in the correct order, together with the magazine, from the slide projector.

Figure 4:
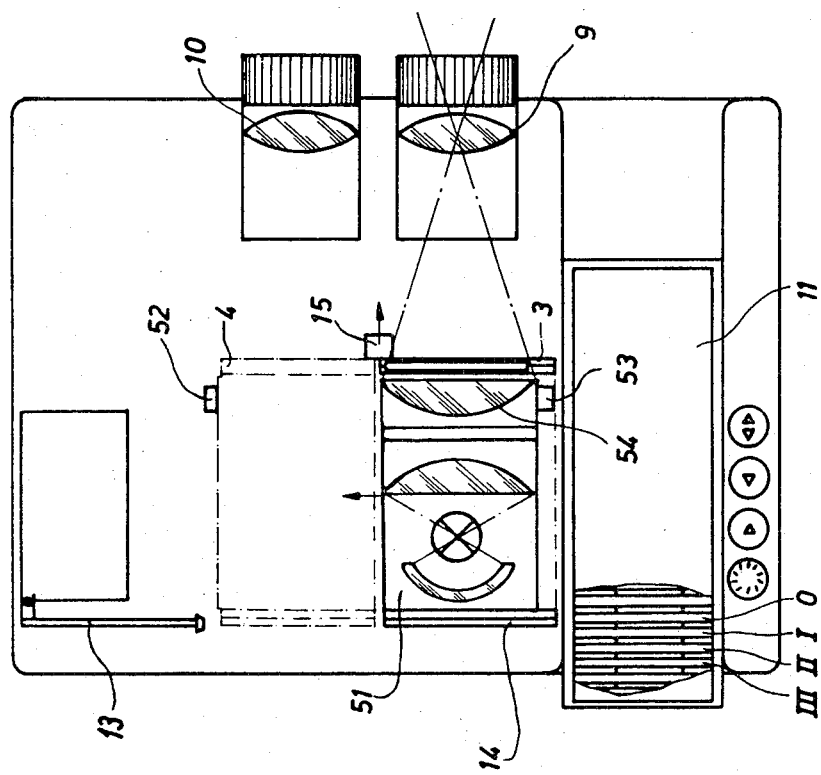
FIG. 4 is a view similar to FIG. 2 showing a modified form of the invention, using only a single illumination unit rather than two illumination units.

In a modification or further version of the invention, illustrated in FIG. 4, the slide projector has two slide carriers and only a single illumination system displaceable transversally to the optical axes. All other elements, such as the lenses 9 and 10, the magazine 11, the alternating ejector 13, and the stop 15 axially displaceable in respect of the optical axes, are provided in the same way as in the slide projector shown in FIGS. 1 to 3. The slide carriers or holders 3 and 4, however, are displaceable axially along the optical axes, separately from the illumination system 51. The said illumination system 51 is so dimensioned that when it is displaced transversally to the optical axes, in the fading process, in the position between the two optical exes, it will illuminate, at least to the extent of one half, both the slides present in the slide carriers 3 and 4. This insures that the projected picture, in the fading process, will only be slightly altered in brightness.

In order to insure a satisfactory fading effect in this apparatus, the slide carriers 3 and 4 must be situated as close together as possible. This also enables the diameter of the illumination system 51 to be kept small.

The operation of this slide projector is essentially the same as in the case of that described in connection with FIGS. 1 to 3.

In order to effect the fading from the sliding carrier 3 to the sliding carrier 4, the illumination system 51 is displaced transversally to the optical axes, by means of mechanical or electrical driving elements. When the central position is reached the condenser 54 somewhat more than the lower half (when viewed as in FIG. 4) of the slide situated in the slide carrier 4 and somewhat more than the upper half of that situated in the slide carrier 3. On a further movement of the illumination system 51, as far as the stop 52, the complete fading to the slide situated in carrier 4 takes place.

On the next step the slide carrier 3 moves back axially, past the illumination system 51, into the plane of the alternating pusher. The alternating inserter 13 then conveys the slide from the carrier 3 into the magazine 11, and an alternating inserter not shown in the drawing extracts the "new" slide, in accordance with the corresponding stepping movements of the magazine 11, out of the latter, inserting it in the carrier 3. When the said carrier 3 has been loaded with the "new" slide, it moves axially forward, as far as the axially displaceable stop 15. After a further fading operation, by the transverse displacement of the illumination system 51 as far as the fixed stop 53, the slide carrier 4 can be moved axially backwards into the plane of the alternating pusher. In this position the alternating ejector 13 once again takes up the slide situated in the slide carrier 4 and conveys it via the slide guide 14, which is situated behind the illumination system 51, into the magazine 11. The magazine 11 is moved forward by the corresponding step, and the alternating inserter, not shown in the drawing, conveys the "new" slide, via the slide guide 14, into the slide carrier 4, after which this latter can once again be moved forward in the axial direction.

The release process, i.e., the termination of the slide projection, is carried out as in the case of the slide projector described in conjunction with FIGS. 1 to 3. The slide projector last described offers the advantage of a more compact construction.

What is claimed is:

1. A photographic slide projector comprising two projection lens systems situated side by side and having optical axes which are substantially parallel to each other, two slide carriers, one located in the optical axis of each of said projection lens systems, each of said carriers being mounted for movement axially along its respective optical axis between a forward projection position and a rear loading position, and illuminating means for illuminating slides in said carriers when said carriers are in their forward projection positions, the rear loading position of each carrier being spaced rearwardly from its forward projection position by a distance at least as great as the over-all axial length of said illuminating means, so that when one carrier is in its rear position and the other carrier is in its forward position with a slide therein illuminated by said illuminating means, slides may be removed from and inserted in the carrier in the rear position in a direction transversely across the axis of the other carrier in its forward position without interfering with illumination of a slide in the carrier in the forward position.

2. A projector as defined in claim 1, wherein said illuminating means comprises two separate illumination systems, one in the optical axis of each of said projection lens systems.

3. A projector as defined in claim 2, wherein each slide carrier is rigidly connected to its own illumination system and the illumination system moves rearwardly and forwardly bodily with its attached slide carrier when the carrier moves between its forward projection position and its rear loading position.

4. A projector as defined in claim 1, wherein said illumination means comprises a single illumination system movable laterally back and forth from the optical axis of one projection lens system to the optical axis of the other projection lens system.

5. A projector as defined in claim 4, wherein said single illumination system is so dimensioned with relation to the dimensions and lateral spacing of the two slide carriers that as it reaches a mid point in its lateral movement from one axis to the other, it simultaneously illuminates at least one half of the area of each of two slides held respectively in the two slide carriers.

6. A projector as defined in claim 1, further comprising means for holding a slide magazine laterally to one side of a first one of said optical axes, the second one of said optical axes being on the opposite side of said first axis from said magazine, and alternating slide pusher means operating substantially in a plane transverse to said optical axes for shifting slides between said magazine and each of said carriers when the respective carrier is in its said rear loading position.

7. A projector as defined in claim 6, further comprising a slide guide 14 for guiding a slide across said first optical axis while being shifted between said magazine and a slide carrier in said second optical axis.

8. A projector as defined in claim 7, wherein said illuminating means comprises two separate illumination systems, one in each of said optical axes, and wherein said slide guide 14 is mounted on the rear of the illumination system in said first optical axis.

9. A projector as defined in claim 1, characterized by the fact that an axially displaceable stop 15 is provided for the purpose of fixing the axial position of both slide carriers in the zone of the focusing plane.

10. A projector as defined in claim 9, characterized by the fact that the stop 15 is situated between the slide carriers and the projection lens systems.

11. A projector as defined in claim 1, further comprising driving and control means for the axial displacement of the slide carriers 3, 4, both into the zone of the focusing plane and also into the focusing position itself.

12. A projector as defined in claim 1, further comprising means for holding a slide magazine at one side of one of said optical axes, driving means for shifting said slide carriers between their respective forward projection position and rear loading positions, and operating means for feeding slides from a magazine to each of said slide carriers and replacing slides from each of said carriers back into said magazine and moving said magazine longitudinally, all in timed sequence relative to the shifting of said carriers by said driving means.

13. A projector as defined in claim 12, wherein said driving means comprises mechanical driving means 20, 21, 22, 23, and said operating means comprises mechanical operating means 26, 27, 28, 29, 31, 32, 33, 36, 42, 43, 44, 45.

14. A projector as defined in claim 13, characterized by the fact that said shifting means comprises three disks mounted on a driving motor shaft 21, two of said disks being control cams 26, 27, driving an alternating ejector and an alternating inserter 13, 19, through bellcrank levers 28, 29, and the third disk is an eccentric disk 22, which drives said slide carriers through two bellcrank levers 20, 23, which rotate in opposite directions and each of which is coupled to a slide carrier 3, 4, through a sliding guide to drive the said slide carriers 3, 4.

15. A projector as defined in claim 14, characterized by the fact that said operating means comprises a disk 31 which is also mounted on the driving motor shaft 21 and which has two parallel secants which displace in the driving direction a lever arm 32 of a switching claw 36 rotatably mounted on a slider 33 and displaceable between two springs, 34, 35, the slider 33 being mounted in a pin-and-slot guide 37 and held and guided in a neutral position by means of two springs 38, 39, acting in opposite directions to each other in the direction of the slot and being fitted at a bearing point for the switching claw 36 with a stop lug 40 for the alternating inserter 19, while at the opposite end and at right angles to the direction of the slot it is provided with a guide track 47 for one end of a rocker lever 48 mounted between the optical axes and movable into two different angular positions by means of lugs 49, 50, which are secured to and move axially with said slide carriers.

16. A projector as defined in claim 12, characterized by the fact that said rocker lever 48 has a length and angle of rotation selected to insure that in a forward program operation of the projector, the said lever, in conjunction with the lugs 49 and 50, will perform a correction step in the reverse direction when one of the two slide carriers 3 and 4 moves out of its projection position into its loading position.

* * * * *